(12) United States Patent
Mastropaolo

(10) Patent No.: US 6,966,581 B2
(45) Date of Patent: Nov. 22, 2005

(54) APPARATUS FOR DISTINGUISHING BETWEEN TUBING ASSEMBLIES

(75) Inventor: Jeffrey A. Mastropaolo, Bloomingdale, NJ (US)

(73) Assignee: Saint-Gobain Performance Plastics Corporation, Worcester, MA (US)

( * ) Notice: Subject to any disclaimer, the term of this patent is extended or adjusted under 35 U.S.C. 154(b) by 14 days.

(21) Appl. No.: 10/428,976

(22) Filed: May 2, 2003

(65) Prior Publication Data

US 2004/0217586 A1 Nov. 4, 2004

(51) Int. Cl.⁷ .............................................. F16L 35/00
(52) U.S. Cl. ...................................... 285/93; 285/422
(58) Field of Search .................... 285/124.1–124.4, 285/93, 914, 123.2, 24, 123.17, 136.1, 901, 285/335, 911, 124.5, 422; 215/230, 355; 206/459.1, 459; 222/400.7

(56) References Cited

U.S. PATENT DOCUMENTS

| | | | |
|---|---|---|---|
| 3,230,954 A * | 1/1966 | Burgess et al. ............. | 604/507 |
| 3,908,871 A * | 9/1975 | Gottwald ................. | 222/400.7 |
| 4,069,935 A * | 1/1978 | Hampel ...................... | 215/203 |
| 4,699,298 A | 10/1987 | Grant et al. | |
| 4,799,922 A * | 1/1989 | Beer et al. ..................... | 604/74 |
| 4,865,232 A | 9/1989 | Cassady, Jr. et al. | |
| 4,927,188 A | 5/1990 | Sands | |
| 5,423,750 A | 6/1995 | Spiller | |
| 5,586,588 A * | 12/1996 | Knox .......................... | 141/285 |
| 5,839,581 A * | 11/1998 | Vagedes .................. | 206/459.1 |
| 5,878,797 A | 3/1999 | Manuel et al. | |
| 6,216,898 B1 | 4/2001 | Aberdein et al. | |
| 6,221,450 B1 | 4/2001 | Noel et al. | |
| 6,287,284 B1 | 9/2001 | Warburton-Pitt | |
| 6,290,265 B1 | 9/2001 | Warburton-Pitt et al. | |
| 6,379,596 B1 | 4/2002 | Warburton-Pitt | |
| 6,432,343 B1 | 8/2002 | Zollondz et al. | |
| 2004/0055259 A1 * | 3/2004 | Caruso ........................ | 53/471 |

\* cited by examiner

Primary Examiner—Aaron Dunwoody
(74) Attorney, Agent, or Firm—Toler, Larson & Abel, LLP

(57) ABSTRACT

An apparatus for use in identifying or distinguishing at least one substance or article associated with the apparatus is disclosed. The apparatus comprises a translucent body and an identification formation. The translucent body is for defining or engaging an opening. The identification formation is embedded in the translucent body in a predetermined relationship with the opening. At least one characteristic of the identification band is visible through the translucent body.

26 Claims, 3 Drawing Sheets

APPARATUS FOR DISTINGUISHING BETWEEN TUBING ASSEMBLIES

FIELD OF THE INVENTION

The present invention relates generally to the field of tubing assemblies. More particularly, the present invention relates to a structure or apparatus for distinguishing between different tubing assemblies.

BACKGROUND OF THE INVENTION

Stoppers are widely used to seal a vessel or to limit the ability of the contents to escape from the vessel. Some stoppers are solid and thereby prevent any of the matter from entering or leaving the container, while others may include one or more apertures that allow one or more tubes to be inserted into the container. When more than one tube is inserted through a stopper into a vessel, the tubes may be used for different functions or may carry different materials. For example, one tube may be used to insert a certain substance into the vessel, while another tube may be used to remove matter from the vessel or to insert another substance into the vessel. The tubes also may be inserted into the container at different depths so as to remove different layers of matter, or to remove different phases of matter, such as a gas or a liquid. Thus, it is important that one is able to distinguish between the tubes and the different functions of those tubes.

Clear or translucent tubing is widely used and can be helpful in some situations in distinguishing between the different tubes. However, in many situations, being able to see the contents of the tubing does not enable one to distinguish between the tubes. Different tubes may be carrying substances that look similar or they may be carrying clear or substantially transparent substances. Moreover, it may be necessary to distinguish between the tubes at a time when they are empty, such as during the assembly and set up of a particular arrangement of tubes and vessels, in which case being able to see through the tubes is unhelpful.

Various method and techniques have been used to improve one's ability to distinguish between different tubes. One such method is to attach a label or some other indication to the tube and/or the stopper using various adhesives. However, such adhesives generally have not been found to reliably bond to the materials commonly used to make stoppers and tubes. Moreover, physically attached signs or labels can, overtime, become worn and illegible, or may eventually become detached from the appropriate stopper or tube. Such labels may also be difficult to read from a plurality of different angles and may, depending on the environment in which the stopper and the tubes are used, become difficult to read due to debris that may build up on the labels.

Another method or technique used to place identifiers on stoppers and/or tubes consists of placing labels on the outside of the tubes or stoppers and then molding over the labels. This overmolding technique creates a raised section on the stopper or tubing and involves a additional manufacturing process, which generally results in additional manufacturing costs.

Accordingly, it would be advantageous to provide a structure or apparatus that would enable someone to distinguish between different tubes and/or stoppers regardless of the environment in which they are used. Moreover, it would be advantageous to provide such a structure or apparatus that could not easily be removed or worn off and that would not also require additional manufacturing processes. Additionally, it would be advantageous to provide a structure or apparatus for differentiating between different tubes and/or stoppers that would be effective when viewed from any of a wide range of directions. Furthermore, it would be advantageous to provide such a structure or apparatus that would not physically distort the shape of the tubing or other parts of the tubing assembly or contaminate the substances used in connection with the tubing assembly.

Accordingly, it would be advantageous to provide an apparatus for distinguishing between tubing assemblies that has any one or more of these or other advantageous features.

SUMMARY OF THE INVENTION

The present invention relates to an apparatus for use in identifying or distinguishing at least one substance or article associated with the apparatus that comprises a translucent body and an identification formation. The translucent body is for defining or engaging an opening. The identification formation is embedded in the translucent body in a predetermined relationship with the opening. At least one characteristic of the identification band is visible through the translucent body.

The present invention also relates to an apparatus for use in conjunction with tubing assemblies and vessels that comprises a translucent body and an identification formation. The translucent body is configured to be releasably coupled to a mating portion of a tubing assembly or a vessel and includes an aperture that extends through the translucent body. The identification formation is embedded within the translucent body and substantially surrounds the aperture in the translucent body.

The present invention further relates to a stopper for coupling to an open end of a vessel and for allowing tubes to pass through the stopper into the vessel that comprises a translucent silicone body and at least one colored ring. The translucent silicone body is configured to releasably couple to the vessel and includes at least one aperture that extends through the translucent silicone body and that is configured to receive a tube. The at least one colored ring is embedded in the translucent body, and each colored ring substantially surrounds an aperture. The color of each ring is associated with a particular tube.

The present invention also relates to a method of making an apparatus for use with tubing assemblies and vessels that comprises the step of preparing a mold for a translucent body that includes at least one aperture that extends through the translucent body. The method also comprises the steps of inserting an identification formation into the mold and molding the translucent body around the identification formation such that the identification formation corresponds to the aperture.

The present invention still further relates to a tubing system for use with at least one vessel that comprises a translucent body, a first identification formation, a second identification formation, a first tube, and a second tube. The translucent body is configured to releasably couple to the vessel and includes a first aperture and a second aperture. Each aperture extends through the translucent body and is configured to receive a tube. The first identification formation substantially surrounds the first aperture and has a first set of characteristics visible through the translucent body. The second identification formation substantially surrounds the second aperture and has a second set of characteristics visible through the translucent body. Each identification formation is embedded in the translucent body. The first tube cooperates with the first aperture and is associated with the first set of characteristics. The second tube cooperates with the second aperture and is associated with the second set of characteristics.

DETAILED DESCRIPTION OF THE PREFERRED EMBODIMENTS

Figure 1:
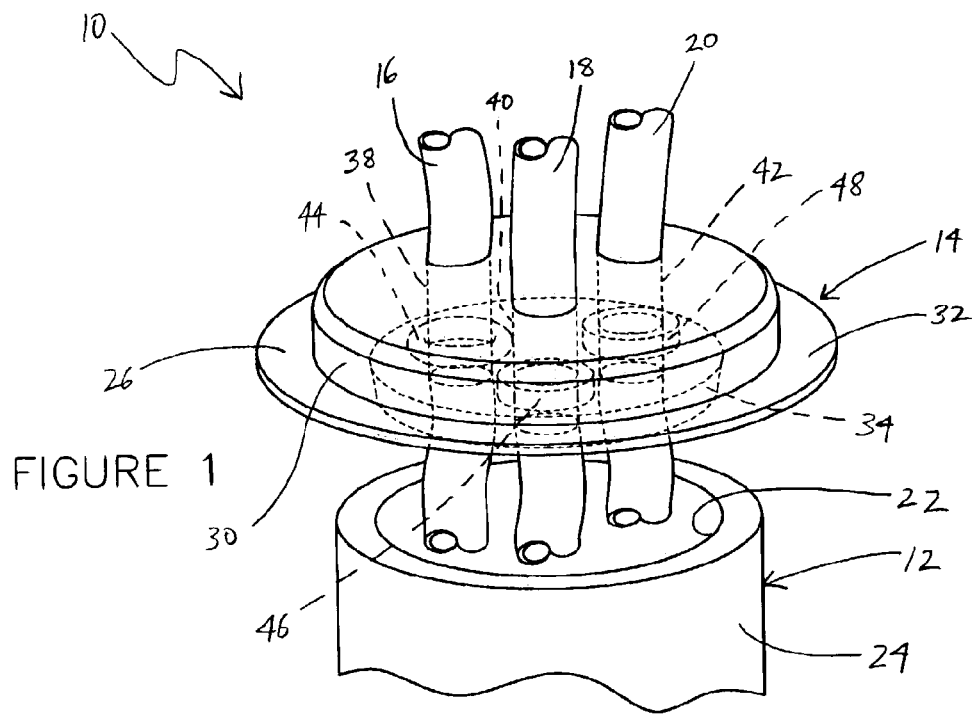
FIG. 1 is a perspective view of a tubing system according to one embodiment.

Referring to FIG. 1, a tubing system 10 is shown according to a preferred embodiment. Tubing system 10 includes a vessel 12, a stopper 14, and tubes 16, 18, and 20.

Vessel 12 may be any one of a variety of different containers, beakers, bottles, canisters, flasks, receptacles, tanks, vats, vials, etc. that are generally used to hold or contain substances or articles. Vessel 12 may be made from a number of different materials (such as a polymer, glass, wood, ceramic, etc.) and may take one of a plurality of different shapes and sizes. According to a preferred embodiment, vessel 12 is of a type used in the pharmaceutical industry and has an open first end 22, side wall(s) 24, and a closed bottom end (not shown). Open first end 22 is configured to receive stopper 14, which may be used to help retain or control the substance or matter within vessel 12.

Tubes 16, 18, and 20 are each silicone tubes that are used extensively in medical, pharmaceutical, chemical, and other applications. The tubes may have one of a plurality of different diameters and wall thicknesses, depending on the application in which the tubes are utilized and on the substances, matter, or materials the tubes are used to transport. Generally, tubes 16, 18, and 20 are used to transport a substance from one location to another, such as from one vessel to another. According to alternative embodiments, the tubes may be made from any one of a variety of materials suitable for the particular purpose of each tube. Silicone is one material that is often used to make such tubes.

Stopper 14, a device for substantially obstructing or hampering the movement of the substance or matter within vessel 12, may be a variety of different sizes, shapes, and configurations. According to a preferred embodiment, stopper 14 includes a body 26 and identification formations 44, 46, and 48.

Figure 2:
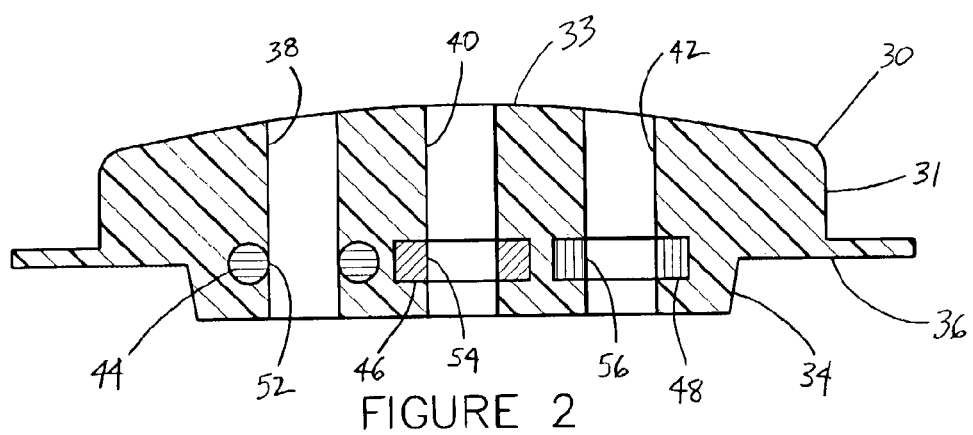
FIG. 2 is a cross-sectional view of the stopper of FIG. 1 taken along a stepped line that passes through the center of each aperture.

Body 26 of stopper 14 includes an upper region 30, a middle region 32, and a lower region 34. Lower region 34 and middle region 32 cooperate to seal against open end 22 of vessel 12 when stopper 14 is coupled to vessel 12. Lower region 34 extends from the underside of middle region 32 and has a frusto-conical shape (e.g. the diameter of lower region 34 decreases as it extends away from the underside of middle region 32). The taper of lower region 34 allows lower region 34 to form a progressively tighter seal against an inside surface of open first end 22 of vessel 12 as lower region 34 is pushed further into open end 22 of vessel 12. Middle region 32 has a diameter that is greater than the largest diameter of lower region 34 and is intended to serve as both a stop and/or a secondary seal. An underside 36 of middle region 32 is substantially flat and contacts first end 22 when stopper 14 is pushed completely onto first end 22 of vessel 12. The contact of middle region 32 with first end 22 of vessel 12 serves to prevent stopper 14 from being pushed further into vessel 12 and may form at least a partial seal between stopper 14 and vessel 12. Upper region 30 is a generally cylindrical extension that projects from middle region 32 in a direction opposite the direction of the extension of lower region 34. As shown in FIG. 2, the transition from cylindrical side 31 of upper region 30 and distal end wall 33 of upper region 30 may be beveled or radiused. Upper region 30 has a diameter that is less than the diameter of middle region 32 but greater than the diameter of lower region 34, and upper region 30 may serve to at least partially reduce the deflection of middle region 32 that may otherwise result from the force generated when middle region 32 contacts open end 22 as stopper 14 is pushed into vessel 12. According to alternative embodiments, the stopper (and each of the lower portion, middle portion, and upper portion) may take any of a wide variety of shapes and may be adapted to cooperate with a wide variety of different vessels or containers.

Referring still to FIG. 1, body 26 also includes three apertures 38, 40, and 42, which extend through body 26. Each of apertures 38, 40, and 42 are sized to allowed tubes 16, 18, and 20, respectively, to fit inside of the apertures and to extend through stopper 14 into vessel 12. According to an alternative embodiment, body 26 may include any number of apertures, and the apertures may be sized to accommodate a variety of different tubing sizes.

According to a preferred embodiment, the body is molded from a translucent silicone. However, according to alternative embodiments, the body may be made from one of, or a combination of, a variety of different materials, including but not limited to polymers and rubbers.

Referring to FIGS. 1 and 2, stopper 14 is illustrated as including three identification formations shown as washers, rings, or bands 44, 46, and 48. Identification formations 44, 46, and 48 are generally circular, with each having an opening 52, 54, and 56, respectively, in the center of the identification formation. Identification formations 44, 46, and 48 are located within body 26 of stopper 14 such that openings 52, 54, and 56 generally align with, and identification formations 44, 46, and 48 generally circumscribe (or generally surround), apertures 38, 40, or 42, respectively. In such a configuration, each identification formation corresponds to a particular aperture in stopper 14 and may serve to allow a user of stopper 14 to differentiate between the different tubes interacting with each of the different apertures.

To allow a user to distinguish between the different tubes, each identification formation possesses a certain set of characteristics that a user may use as a basis for comparison with other identification formations. For example, if one tube is used for a particular purpose or to transport a specific substance, the identification formation associated with the aperture through which the tube extends may have a certain set of characteristics. If another tube is used for a different purpose or to transport a different substance, the identification formation associated with the aperture through which the tube extends may have a set of characteristics different from the set of characteristics associated with the first tube. If the tubes perform the same function, transport the same substances, or are similar in some other respect, the identification formations associated with the tubes may have the same set of characteristics. In this way, the identification formations may be used to distinguish between the different tubes that are coming into and out of a particular vessel or system of vessels.

Because body 26 is preferably made from a translucent material, the set of characteristics of any identification formation preferably includes any characteristic that is visible through body 26. Accordingly, the characteristics of an identification formation may include, but are not limited to, color, size, shape (both overall and cross-sectional), orientation, formation, etc. The combination of these individual characteristics forms a characteristic set.

According to alternative embodiments, the color of an identification formation may be any one of a plurality of different colors, color combinations, or pattern of colors. Furthermore, a stopper may include one or more identification formations, with each identification formation being the same color, a different color, or with some identification formations being the same color and some being different colors. For example, in the embodiment illustrated in FIG. 2, identification formations 44, 46, and 48 are shown (through cross-hatching) as being blue, green, and red, respectively.

According to other alternative embodiments, an identification formation may be any of a variety of sizes, provided the identification formation conforms with the limitations established by the size of the stopper and the apertures provided in the stopper. For example, in one embodiment, the aperture in an identification formation may have the same diameter as the opening the identification formation circumscribes and may form a portion of the wall defining the opening in the stopper. In another embodiment, the diameter of the aperture may be larger than the diameter of the opening in the stopper such that the identification formation forms no part of the wall defining the opening in the stopper. Moreover, the width of the identification formation or band (e.g. the distance between the outer diameter of the identification formation and the diameter of the aperture) may be varied. According to other alternative embodiments, other dimensions and/or proportions of the identification formation may be varied.

Figure 6:
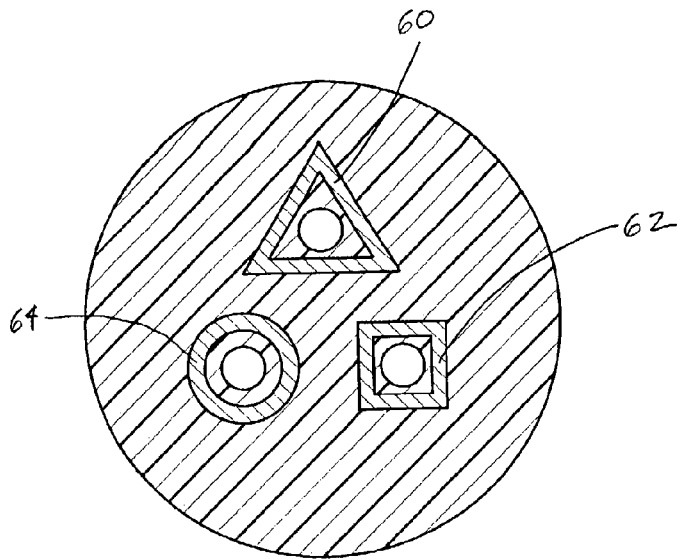
FIG. 6 is a top cross-sectional view of a stopper according to another embodiment.

According to still other alternative embodiments shown in FIG. 6, the overall shape of the identification formation may be any one of a plurality of different shapes, including circular, square, rectangular, triangular, football-shaped, octagonal, star-shaped, or any of a variety of other shapes. As with the overall shape, the shape of the cross-section of an identification formation may also be any one of a variety of different shapes, including rectangular, square, circular, triangular, football-shaped, oval, or any of a variety of other shapes.

According to further alternative embodiments, the orientation of the identification formation may also serve as a characteristic of the identification formation. For example, the identification formation may be positioned such that it is substantially perpendicular to the central axis of the stopper or to the central axis of the aperture to which it corresponds, or it may be positioned at any other angle with respect to the central axis. According to other alternative embodiments, the identification formation may be configured such that a specific portion of the identification formation points in a particular direction or such that the identification formation is located on a certain side of the aperture to which it is associated.

Figure 7:
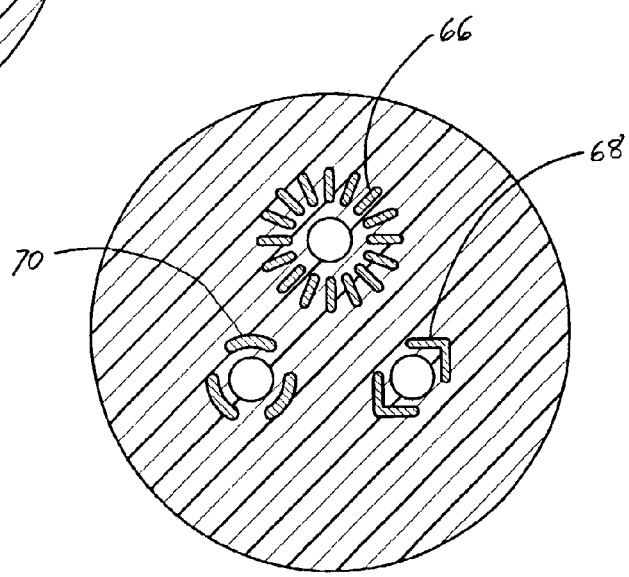
FIG. 7 is a top cross-sectional view of a stopper according to another embodiment.
Figure 8:
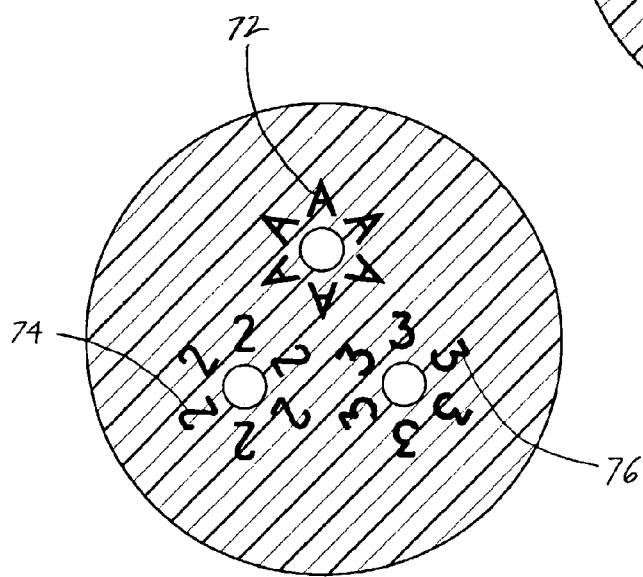
FIG. 8 is a top cross-sectional view of a stopper according to another embodiment.

According to still further alternative embodiments, the identification formation may be provided in a plurality of different formations. For example, the identification formation may be comprised of a single, continuous element or segments (as illustrated by identification formations 60, 62, and 64 in FIG. 6), or the identification formation may be comprised of multiple, discontinuous elements (as illustrated by identification formations 66, 68, and 70 in FIG. 7). If the identification formation is made up of multiple, discontinuous elements or segments, each segment may be a letter (such as in identification formation 72 in FIG. 8), a number (such as in identification formations 74 and 76 in FIG. 8), or any other shape or design (such as in identification formations 66, 68, and 70 in FIG. 7). Whether the identification formation is made up of a single segment or multiple segments, the identification formation is generally of such a design that the identification formation corresponds to an aperture in the stopper.

Figure 3:
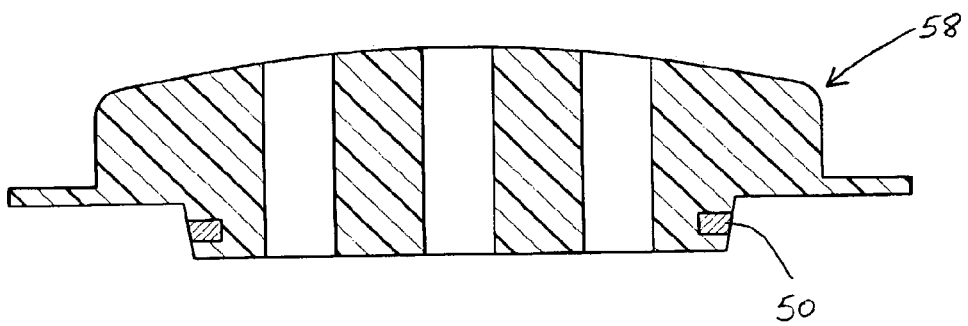
FIG. 3 is a cross-sectional view of a stopper according to another embodiment.

According to yet another alternative embodiment shown in FIG. 3, an identification formation shown as ring 50 may correspond not to a particular aperture in the stopper, but rather to an entire stopper 58 or to the vessel into which stopper is configured to be inserted. Thus, if a particular stopper is to be used with a particular substance or a particular vessel, an identification formation similar to ring 50 may be used to distinguish one stopper from the next. Instead of circumscribing a particular aperture, ring 50 is provided substantially along the outer edge of stopper 58 and circumscribes the apertures as a group. According to alternative embodiments, the identification formation may be provided in any region of the stopper (e.g. the upper, middle, or lower region). According to other alternative embodiments, the identification formation may share an outer surface with the stopper (e.g. have an outer diameter equal to that of the stopper), or the identification formation may have an outer diameter that is less than the outer diameter of the stopper. According to still other alternative embodiments, the identification formation may be used alone or in conjunction with other identification formations, such as identification formations that correspond to a particular opening or aperture that may be provided in the stopper.

Figure 4:
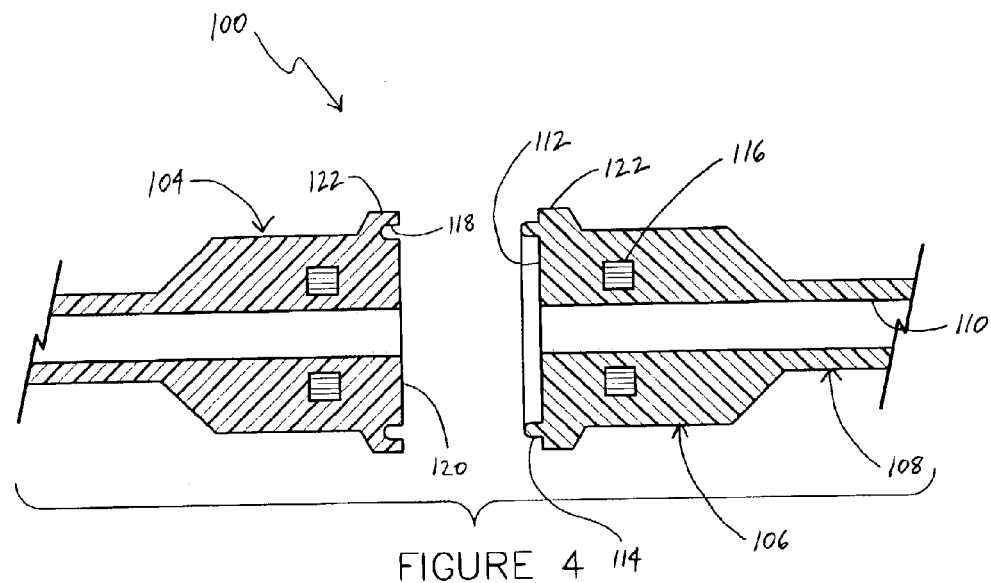
FIG. 4 is an exploded cross-sectional view of a coupling apparatus according to one embodiment.

Referring now to FIG. 4, an apparatus 100 (e.g. coupling apparatus, tube coupling, end, coupler, mating couplings, tubing apparatus etc.) for coupling two tubes together is shown. Apparatus 100 includes a male end 102 and a female end 104.

Male end 102 includes a cylindrical body portion 106 and a tube portion 108, each of which defines an opening 110 that extends continuously through the central axis of each of body portion 106 and tube portion 108. According to a preferred embodiment, body portion 106 and tube portion 108 are constructed from a translucent material, with tube portion 108 extending from one end of body portion 106 and being integrally formed with body portion 106. Body portion 106 has a greater diameter than tube portion 108, and the transition from tube portion 108 to body portion 106 is gradual (e.g. tapered, beveled, or stepped). According to alternative embodiments, the transition may be abrupt.

Body portion 106 includes a flat face 112, a protrusion 114, and an identification formation 116. Face 112 (e.g. sealing surface, surface, plane, etc.), which is formed on the end of body portion 106 that is opposite the end from which tube portion 108 extends, is a generally flat plane that is oriented perpendicular to the central axis of body portion 102. Protrusion 114 extends perpendicularly and outwardly from face 112 and encircles opening 110.

Identification formation 116 is substantially similar to the identification formations described above in relation to the stopper. According to a preferred embodiment, identification formation 116 is a washer or ring embedded within body portion 106 that has an aperture extending therethrough that shares a central axis or center point with opening 110. According to alternative embodiments, as described above in relation to identification formations included in stoppers, the identification formation in male end 102 may include a particular combination or set of characteristics that are discernable through translucent body portion 106. These characteristics may include, but are not limited to, color, size, shape (both overall and cross-sectional), orientation, formation, etc. By comparing the set of characteristics of the identification formation embedded in the male end with the set of characteristics of identification formations embedded in various female ends, the male end can be matched with the appropriate female end, and vice versa. This technique helps to ensure that the right tubes get coupled together and helps reduce the effort that would otherwise be required to trace various tubes back to their sources to determine which tubes should be connected together.

Female end 104 is substantially the same as male end 102, with the only difference being that instead of having a projection extending from a face 120, female end 104 includes a groove or channel 118 that is configured to receive projection 114 of male end 102. When coupled together, face 112 of male end 102 contacts face 120 of female end 104 to form at least a partial seal. To maintain tubing apparatus 100 in a coupled position, male end 102 and female end 104 each include a flange 122 that has a greater diameter than the body portion of male end 102 and female end 104. A clamp or band (not shown) encircles the region of greater diameter formed by the flanges and thereby couples the flanges together to prevent male end 102 and female end 104 from becoming separated.

Figure 5:
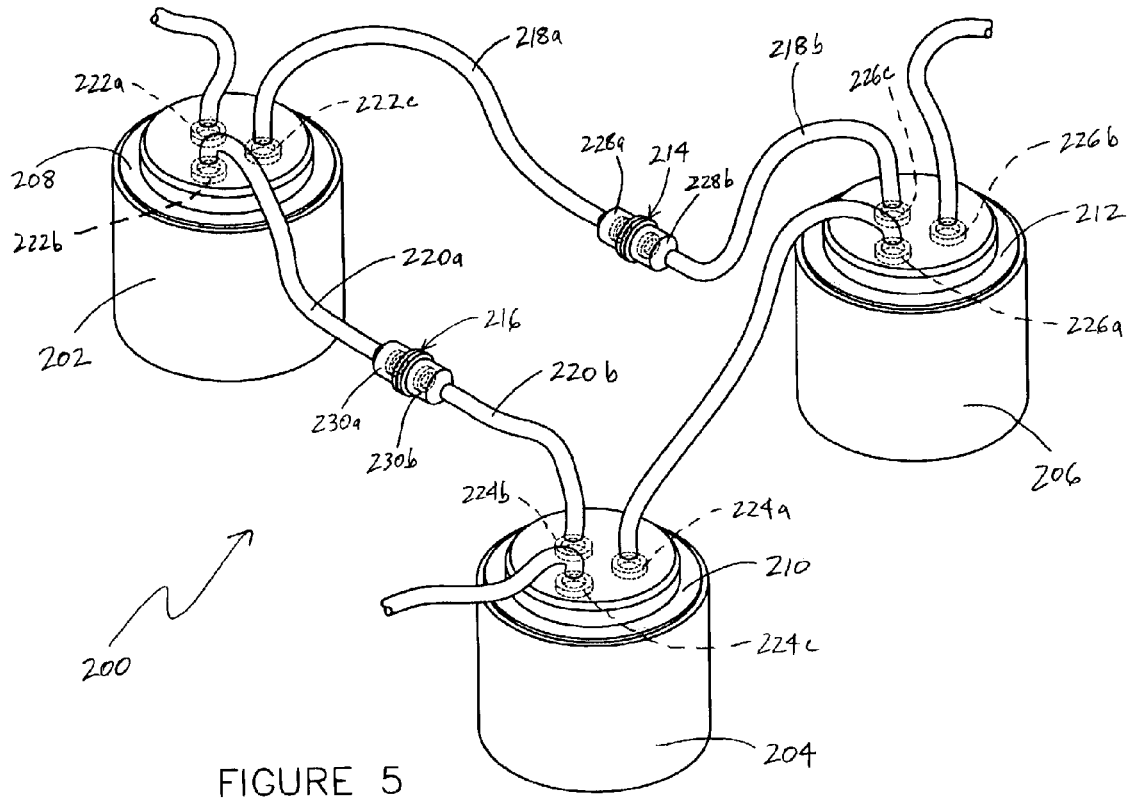
FIG. 5 is a perspective view of a tubing system according to another embodiment.

Referring now to FIG. 5, various tubes, stoppers, coupling apparatuses, and vessels are shown in a tubing system 200. As shown, the system includes three vessels 202, 204 and 206 that are covered by stoppers 208, 210, and 212, respectively. Each stopper includes three apertures and each aperture has a tube passing through it. Two coupling apparatuses 214 and 216 are shown, with coupling apparatus 214 serving to couple tube 218a with tube 218b and with coupling apparatus 216 serving to couple tube 220a with tube 220b. Three identification formations are provided in each of stoppers 208, 210, and 212, with one around each aperture. Moreover, one identification formation is provided in each portion (e.g. male and female portion) of each of coupling apparatus 214 and 216.

As one example of how the identification formations can be used to distinguish between different tubes, consider the following situation. Assume vessel 202 includes a substance (substance 1) that needs to be added to both of vessels 204 and 206. Assume further that vessel 204 includes a substance (substance 2) that needs to be added to vessel 206 after substance 1 is added to vessel 204. Finally, assume that substance 1 needs to be added to vessel 206 after substance 2 is added to vessel 206. In such a situation, identification formations 222b and 222c may have the same set of characteristics because the tubes associated with identification formations 222b and 222c will be transporting the same substance. Moreover, identification formations 224b and 226c may have the same set of characteristics as 222b and 222c to indicate that the substance from vessel 202 is being transported to vessels 204 and 206. Similarly, identification formation 224a may have the same set of characteristics as identification formation 226a to indicate that substance 2 is being transported from vessel 204 to vessel 206. Additionally, identification formations 222a, 224c, and 226b may each have a set of characteristics that corresponds to the substance carried by, or to the purpose of, the tube associated with each identification formation. Identification formations 228a and 228b of coupling apparatus 214 may have the same set of characteristics to indicate that the male portion containing identification formation 228a should be coupled to the female portion containing identification formation 228b. Identification formations 228a and 228b may also have the same set of characteristics as identification formations 222c and 226c to indicate that tubes 218a and 218b should be inserted into the apertures associated with identification formations 222c and 226c. Identification formations 230a and 230b of coupling apparatus 216 may be set in a configuration similar to that of the identification formations of coupling apparatus 214.

As one skilled in the art will recognize, an almost endless number of combinations and configurations of vessels, stoppers, tubes, coupling apparatuses, and identification formations are possible. The example described above is not intended to limit how such devices can be used and combined, but rather is intended to serve as an example of how such devices may be used in only one of a multitude of possible situations and environments.

According to a preferred embodiment, the stopper and the coupling apparatuses are molded from a translucent silicone. To provide a stopper or coupling apparatus having an identification formation embedded therein, the mold is prepared for the molding process, an identification formation is positioned within the mold, and then the body of the stopper or coupling apparatus is molded around the identification formation. As a result of such a method, the identification formation can be partially or completely surrounded by the translucent silicone. Using such a method of construction, a stopper or coupling apparatus can be made that reduces the likelihood that the identification formation will become separated from the rest of the stopper or coupling apparatus during use. The use of such a method may also eliminate the need for a secondary molding operation.

It is important to note that the construction and arrangement of the elements of the tubing system provided herein are illustrative only. Although only a few exemplary embodiments of the present invention have been described in detail in this disclosure, those skilled in the art who review this disclosure will readily appreciate that many modifications are possible in these embodiments (such as variations in the use of materials, colors, and combinations of shapes; variations in sizes, structures, shapes, dimensions and proportions of the stoppers, tube couplings, identification formations, tubes, apertures and other elements; variations in the arrangement of the identification formations as well as the various other tubing system elements; and variations in the configuration and operation of the tubing system elements) without materially departing from the novel teachings and advantages of the invention. For example, the stopper may be adapted and sized for use on any type of vessel or receptacle and may be used with a variety of substances or materials. The stopper also may be adapted for use on a container or vessel with a square or rectangular mouth or opening or with a mouth or opening having any one of a plurality of other shapes. The stopper may include any number of apertures, and the apertures may be any suitable shape (e.g. square, rectangular, oval, triangular, octagonal, etc.). According to further alternative embodiments, the stopper and apertures may be configured to be used with any type or style of tubing or pipe. Accordingly, all such modifications are intended to be within the scope of the invention as defined in the appended claims.

The order or sequence of any process or method steps may be varied or re-sequenced according to alternative embodiments. Other substitutions, modifications, changes and omissions may be made in the design, operating configuration and arrangement of the preferred and other exemplary embodiments without departing from the spirit of the present inventions as expressed in the appended claims.

What is claimed is:

1. An apparatus for use in identifying or distinguishing at least one substance or article associated with the apparatus, the apparatus comprising:
    a translucent body defining a plurality of openings; and
    a plurality of identification formations embedded in the translucent body, each identification formation being in a predetermined relationship with a respective opening of the plurality of openings, at least one characteristic of each identification formation being visible through the translucent body, wherein each identification formation is a single and continuous element.

2. The apparatus of claim 1, wherein at least a portion of each identification formation is visible from a plurality of directions.

3. The apparatus of claim 1, wherein the translucent body is silicone.

4. The apparatus of claim 1, wherein the identification formation is circular.

5. The apparatus of claim 1, wherein the predetermined relationship of each identification formation and the respective opening is defined by each identification formation circumscribing its respective opening.

6. The apparatus of claim 1, wherein the cross-section of each identification formation is one of a plurality of different shapes.

7. The apparatus of claim 1, wherein each identification formation comprises an aperture concentric with its respective opening.

8. The apparatus of claim 1, wherein each identification formation is one of a plurality of different colors.

9. The apparatus of claim 1, wherein each identification formation is one of a polymer, a rubber, and a silicone.

10. The apparatus of claim 1, wherein the translucent body is molded.

11. The apparatus of claim 1, wherein the at least one characteristic of the identification formation is at least one of color, shape, size, orientation, and formation.

12. The apparatus of claim 11, wherein the at least one characteristic of the identification formation corresponds to the at least one substance or article associated with the apparatus.

13. An apparatus for use in conjunction with tubing assemblies and vessels comprising:
    a translucent body configured to be releasably coupled to a mating portion of a tubing assembly or to a vessel, the translucent body including an aperture extending therethrough; and
    an identification formation embedded within the translucent body and substantially surrounding the aperture in the translucent body, wherein the identification formation is a single and continuous element.

14. The apparatus of claim 13, wherein the translucent body is a stopper.

15. The apparatus of claim 13, wherein at least a portion of the identification formation is visible from a plurality of directions.

16. The apparatus of claim 13, wherein the translucent body is silicone.

17. The apparatus of claim 13, wherein the identification formation is circular.

18. The apparatus of claim 13, wherein the cross-section of the identification formation is one of a plurality of different shapes.

19. The apparatus of claim 13, wherein the identification formation comprises an aperture concentric with the aperture in the translucent body.

20. The apparatus of claim 13, wherein the identification formation is one of a plurality of different colors.

21. The apparatus of claim 13, wherein the identification formation is one of a polymer, a rubber, and a silicone.

22. The apparatus of claim 13, wherein the translucent body is molded.

23. The apparatus of claim 13, wherein at least one characteristic of the identification formation is visible through the translucent body.

24. The apparatus of claim 23, wherein the at least one characteristic of the identification formation is at least one of color, shape, size, orientation, and formation.

25. The apparatus of claim 24, wherein the aperture of the translucent body is configured to receive a portion of a tubing assembly.

26. The apparatus of claim 25, wherein the at least one characteristic of the identification formation corresponds to a particular portion of the tubing assembly.

* * * * *

UNITED STATES PATENT AND TRADEMARK OFFICE
CERTIFICATE OF CORRECTION

PATENT NO. : 6,966,581 B2
DATED : November 22, 2005
INVENTOR(S) : Mastropaolo

It is certified that error appears in the above-identified patent and that said Letters Patent is hereby corrected as shown below:

Column 9,
Lines 45 and 49, delete "the indentification" and insert -- each indentification --.

Column 10,
Line 2, delete "the indentification" and insert -- each indentification --.

Signed and Sealed this

Eighteenth Day of April, 2006

JON W. DUDAS
*Director of the United States Patent and Trademark Office*